Feb. 25, 1964   W. P. KRUSE ETAL   3,122,740
VELOCITY DETERMINING DEVICE
Filed Jan. 10, 1957   4 Sheets-Sheet 4

INVENTOR.
John McConnell
William P. Kruse
By Donald W. Phillion
HIS ATTORNEY

United States Patent Office 3,122,740
Patented Feb. 25, 1964

3,122,740
VELOCITY DETERMINING DEVICE
William P. Kruse, Chicago, and John McConnell, Wilmette, Ill., assignors to Admiral Corporation, Chicago, Ill., a corporation of Delaware
Filed Jan. 10, 1957, Ser. No. 633,432
11 Claims. (Cl. 343—8)

This invention relates generally to radar systems, and more particularly to a radar system for determining and recording the velocity of vehicles travelling on a roadway at a rate of speed in excess of a predetermined speed, and for making a record of the identity of the speeding vehicle.

In the prior art, there are a number of devices and system for determining and recording the velocity of a moving object. Some of these systems make use of the Doppler effect. In such systems a radio frequency signal may be transmitted towards a moving object from a given position. The transmitted signal is reflected from the moving object back to a receiver which is also located at said given position. Because the object is moving, the received reflected wave will have a different frequency than that of the transmitted wave.

A portion of the transmitted signal and the received reflected signal are mixed in the receiver to produce a resultant signal whose frequency is equal to the difference in frequencies of the transmitted signal and the received reflected signal. This difference in frequencies will vary in accordance with the speed with which the moving object is approaching or leaving said given position. Such a signal can be translated into some visual indication of speed by means employing a meter, for example. This type system is in fairly common use today in the enforcement of speed laws, both in urban and rural areas. With the existing equipment of this kind, a law enforcement officer usually watches the meter and when it indicates that a speed law is being violated the officer can either pursue the violater, notify another officer located down the highway, or write down a description of the speeding vehicle and later mail a summons to he registrant of the car.

There are several possible alternatives to the above-described methods of handling a speeding vehicle. It may be quite desirable to obtain permanent evidence of the speed and identification of the vehicle by means of, for example, a camera which simultaneously would photograph the vehicle and the speed indicating meter, or by means of tape recorder which would record the signal representative of the speed of the vehicle. Another useful characteristic of this type equipment would be means whereby the calibration of the meter would be checked after each speed violation, and whereby such calibration check would be recorded by the camera or the tape recorder. Also, it might be desirable for the officer to be able to pursue the speeder, bring him back to the equipment, and show him the meter reading. This latter feature would require circuit means whereby the meter reading would be maintained substantially at its full reading for a period of time of the order of twenty or thirty minutes. Another advantageous characteristic of an equipment of this type would be a feature whereby the equipment would ignore vehicles travelling under a predetermined speed.

There are known, in the prior art, devices of the type utilizing the Doppler effect for determining the speed of a vehicle and which employ camera means for permanently recording such speed and for providing permanent identification of the vehicle. However, no known structures exist which utilize magnetic recorders as permanent recording means, or which provide for calibration checks of the meter for each speed reading, or means for making permanent records of said calibration checks, or means for holding the meter reading, or means for ignoring vehicles travelling under a predetermined speed.

An object of the invention is to provide a radar-type equipment which will determine the velocity of a speeding vehicle, which will make a permanent record of the speed of the speeding vehicle, and which will calibrate the accuracy of the equipment after each operation thereof and make a permanent record of such calibration.

Another object of the invention is to provide a radar-type equipment which will determine the velocity of a speeding vehicle and which will make a permanent record of the speed of the speeding vehicle by recording an audio signal whose pitch is proportional to the speed of the speeding vehicle.

A further object of the invention is to provide a radar-type speed determining device which will automatically make a photographic record of a speeding vehicle and, further, which will check the calibration of a speed indicating means and make a permanent record of such calibration check.

Another object of the invention is to provide a radar-type speed determining equipment which will ignore vehicles travelling at a speed less than a predetermined speed.

A fifth purpose of the invention is to provide a radar-type speed determining device which will maintain a speed reading for several minutes after the speeding car has passed out of range of the device.

A further aim of the invention is the improvement of radar-type speed determining devices, generally.

In accordance with the invention, radio frequency transmitting and receiving means are employed to measure the velocity of a moving object by producing a resultant signal whose frequency varies as the speed of the moving object, in accordance with Doppler's effect. Frequency responsive circuit means, including speed indicating means such as a meter, are provided to become energized in response to said signal to produce a visual indication of the speed of the moving object. Recording means, and control means therefor, are constructed and arranged to respond to the energization of the frequency responsive circuit means to make a permanent record of the speed of the moving object. Calibration means is constructed and arranged to respond to the aforementioned control means to check the calibration of the speed indicating means and to cause said recording means to make a permanent record of such calibration check.

In accordance with a feature of the invention, the recording means can be a movie camera or a sound recording means, such as, for example, a magnetic tape. If a camera is employed, photographing of the vehicle and the meter can be done simultaneously on the same strip of film by well known means, thus providing for a permanent identification of the speeding vehicle and, at the same time, establishing a permanent record of the speed of the vehicle. If a magnetic tape is employed the permanent record of the speed of the vehicle can be recorded thereon as an audio signal whose pitch is proportional to the frequency of the above-mentioned resultant signal.

In accordance with another feature of the invention, the frequency responsive means employed is constructed so that it can be adjusted to register only speeds above selectable predetermined minimum speed. Control circuit means are constructed and arranged so that the recording means, whether it be camera or sound recording, apparatus, will be actuated only when a vehicle having a speed greater than said predetermined minimum speed comes into the range of the equipment.

In accordance with a further feature of the invention, the calibration means includes signal generating means constructed to generate signals of known frequencies (also referred to herein as calibrating signals) for the purpose of calibrating the said meter. A calibration control circuit is provided to cause the signal generating means to supply the calibration signals to the aforementioned frequency responsive circuit to check the calibration of the meter after each time of energization thereof. This calibration control circuit also functions to cause energization of the recording means so that a permanent record of the calibration check is made. In the case where the recording means is a movie camera, this permanent record of the calibration check is in the form of a photograph taken of the meter at the time the calibrating signals are being supplied to the frequency responsive circuit. In the instance where a sound recording apparatus is employed, the permanent record of the calibration check is in the form of a recorded audio signal whose pitch is proportional to the speed of the vehicle.

A further feature of the invention is circuit means constructed to maintain the meter indication of the speed of the vehicle for several minutes.

Other features of the invention include a second speed indicating meter situated remotely from the transmitter-receiver equipment (also referred to herein as the radar unit) and a traffic stoplight also situated remotely from the transmitter-receiver equipment. The remotely situated meter, which is connected to the radar unit by a cable, is caused to respond to the same signal as the first mentioned meter, which is located at the radar unit. The remotely located traffic light is positioned at a point along the road some distance from the radar unit, and will turn red to stop a speeding vehicle. The operation of the traffic light is controlled by some convenient signal produced within the main radar unit.

These and other objects and features of the invention will be more fully understood from the following detailed description thereof, when read in conjunction with the drawings, in which.

Figure 1:
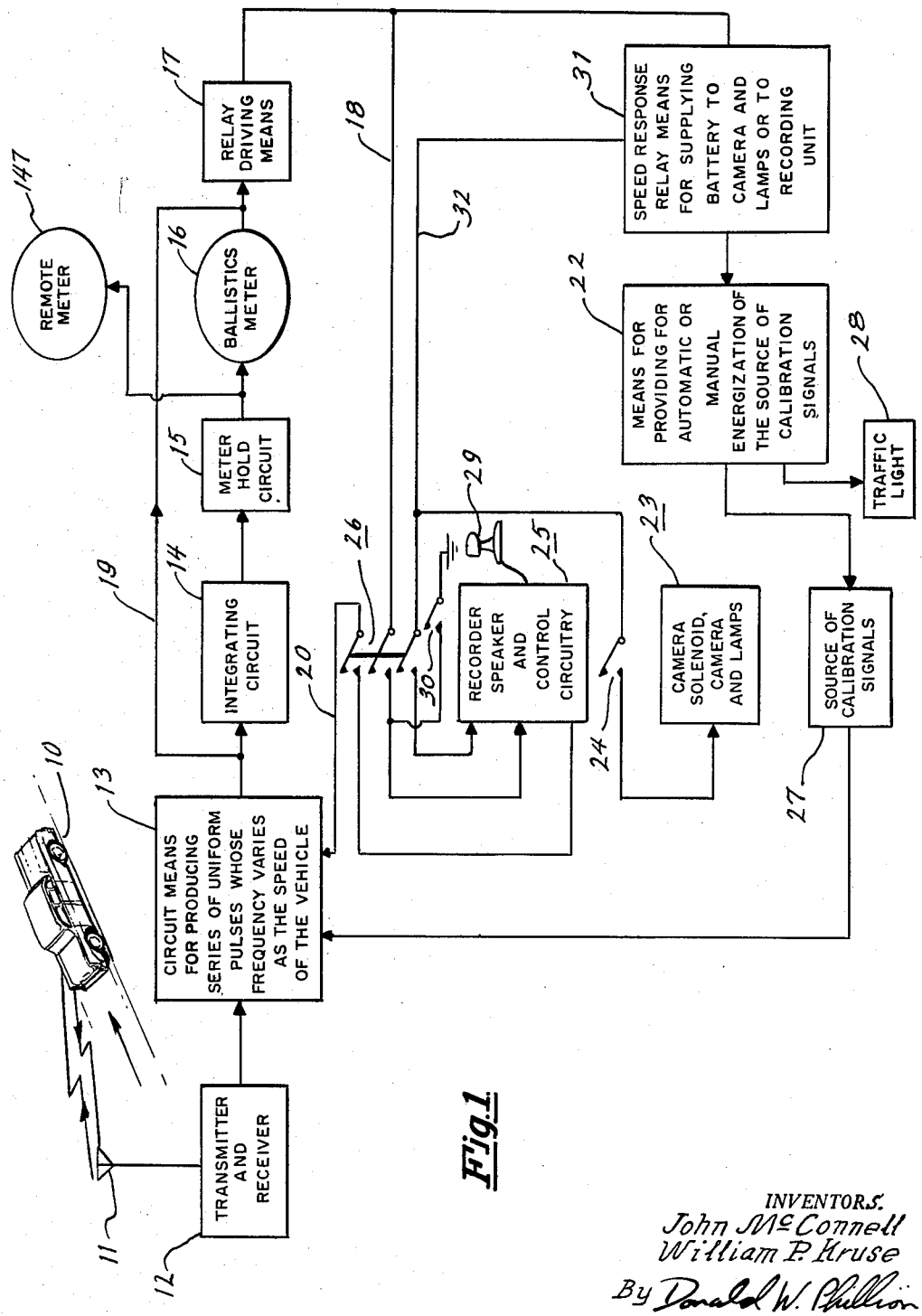
FIG. 1 is a block diagram of the invention.

Referring now to FIG. 1, a radio frequency signal is generated within the block 12 and transmitted via the antenna 11, which may be a directional-type antenna. The transmitted signal is reflected from a moving object, such as the automobile 10, and is intercepted by the antenna 11, which performs the dual function of transmitting and receiving signals. If the car 10 is moving, the frequency of the received reflected signal will be different from the frequency of the transmitted signal. More specifically, if the car 10 is approaching the antenna 11, the frequency of the reflected signal as it is received by the antenna 11 is greater than the frequency of the transmitted signal. Conversely, if the car 10 is moving away from the antenna 11, the frequency of the received reflected signal will be less than the frequency of the transmitted signal.

Some of the signal generated by the transmitted is supplied directly to the receiver circuit, which is represented as being also within the block 12. The receiver circuit functions to mix the received reflected signal and the generated signal supplied directly thereto to produce a resultant signal whose frequency is equal to the difference between the frequencies of the transmitted signal and the received reflected signal. The frequency of this resultant signal is proportional to the speed of the car (assuming the car to be moving directly towards or directly away from the antenna 11) since the difference in frequencies of the received reflected signal and the radiated signal is proportional to the speed of the car.

It is to be noted that, although not specifically shown, the receiver includes several stages of amplification for amplifying said resultant signal. The several stages of amplification are designed to have an overall frequency response characteristic whereby the gain increases with frequency (within the bandwidth being employed). Thus, the signal representing the speed of the fastest travelling vehicle within the range of the radar equipment will be amplified more than the signals produced by vehicles travelling at a lesser rate of speed. The output signal of the amplifying circuits is supplied to a limiter circuit which includes a D.-C. restorer circuit. The limiter circuit (not specifically shown) is contained in the circuitry represented by the block 13. Because of the D.-C. restorer circuit the limiter circuit will pass only that portion of the signal supplied thereto having the greatest amplitude, which portion will be that having the highest frequency, and which will be representative of the speed of the fastest travelling vehicle. The lower frequency signals appearing at the output terminals of the amplifier circuits (such signals being representative of the speeds of vehicles travelling at lower rates of speed) will not appear at the output terminals of the limiter circuit.

The output signal of the limiter circuit is supplied to other circuit means within the block 13 which functions to produce, in response thereto, a series of pulses having uniform shape, width, and height, but whose rate of repetition varies in accordance with variations in the frequency of said resultant signal. This series of pulses is integrated by the circuitry represented by the block 14 to produce a D.-C. voltage whose magnitude varies as the frequency of repetition of said pulses. This D.-C. voltage is supplied to the meter hold circuit 15 which is essentially a pulse stretching circuit. The ballistic type meter 16, which comprises an indicator and a scale, responds to the signal from the meter hold circuit 15 to indicate the speed of the vehicle. As will be explained in detail later, means are provided to enable the meter 16 to indicate only speeds which are in excess of a given predetermined minimum speed. The last-named means is constructed to be adjustable to enable an operator to select the predetermined minimum speed.

If the signal supplied to the meter 16 from the hold circuit 15 represents a sufficiently high speed to cause the meter 16 to register an indication of said speed, then the relay driving means 17 will respond to said indication to produce a signal which will energize the relay means 31. Energization of the relay means 31 will complete a circuit to cause a voltage to be supplied to the conductor 32.

This voltage supplied to conductor 32 can be utilized to energize the sound recording equipment 25, which includes a recorder such as a tape recorder, a speaker, and control circuitry therefore, which will be described in more detail later. Alteratively, the voltage appearing on conductor 32 can be utilized to energize the camera equipment 23, which is comprised of a solenoid to operate the camera, the camera, and lamps for illumination purposes. The selection of the recorder equipment or the camera equipment is made by closing either the switch 26 or the switch 24, depending upon which method of recording is desired. This can be done manually by the operator.

If the switch 26 is closed (and switch 24 is opened), the recording equipment 25 will begin to operate (assuming battery voltage is being supplied thereto via conductor 32) and will record the audio signal supplied thereto via conductor 18. Now, as stated hereinbefore, a function of the recorder equipment is to record the signal whose frequency varies as the speed of the speeding vehicle. Such a speed indicating signal is produced by the circuit means 13, also as discussed hereinbefore. However, this signal is relatively weak and, consequently, is supplied to the relay driving means 17 through conductor 19 for amplification before it is supplied to the recorder equipment 25. The relay driving means 17 is constructed so that it will not only perform the function of amplifying the aforementioned speed indicating signal, but also will, in response to energization of the meter 16, produce a D.-C. signal to energize the relay means 31.

When the speeding vehicle passes out of range of the equipment, the indicator of the ballistic meter will no longer register an indication of speed and the relay means 31 thereupon will become de-energized, thus cutting off the energizing voltage supplied to the recording unit 25 via the conductor 32. The means 22 will respond to the de-energization of said relay means 31 to energize the calibration signal source 27. The calibration signal source 27 will then supply a calibrating signal of a known frequency to the circuit means 13. This calibrating signal will produce the same general effect on the circuit elements, including blocks 13, 14, 15, 16, 17, and 31, as did the speed indicating signal supplied to the circuit means 13 from the receiver 12, except that the signal from the calibration source 27 has a known frequency. Since the meter 16 will be actuated thereby, the speed responsive relay means 31 will be energized again, thus causing the energizing voltage to be supplied to the audio recording unit 25 through the conductor 32. Simultaneously, of course, the calibration signal will be supplied to the recorder unit via the conductor 18. A time delay circuit (which is part of the circuit means 22) maintains energization of the calibration signal source for a given, predetermined period of time, of the order of a few seconds, to permit a sufficiently long calibration signal to be recorded. When the calibration signal source becomes de-energized at the end of this predetermined period of time, the relay means 31 will become de-energized and the recorder 25 also will become de-energized.

Means including a microphone 29 and a switch 30 are provided to enable the patrolman to record the identification of the vehicle on the recording unit. Closure of the switch 30, which is located at the microphone, will supply negative potential to the recorder and thus energize said recorder.

At a later date, by switching the recording unit from "record" position to "playback" position, the calibration signal and the speed indicating signal recorded on the recorder can be supplied back to the circuit means 13 via switch 26 and conductor 20. These played back signals will cause responses in circuit means 14 and 15 which will produce a deflection of the needle indicator of the meter 16. Consider first the calibration signal. Since the calibration signal was originally of a known frequency representative of a particular speed, the meter can be accurately calibrated by adjusting it to indicate that particular speed. Sufficient time for such an adjustment may be obtained by means of the meter hold circuit 15. It should be noted that during the calibration procedure outlined above, the calibration signal source 27 is disconnected from the speed responsive relay means 31, so that the calibration signal source 27 will not become energized and supply unwanted signals to the circuit means 13. Such a disconnection can be effected by some convenient means such as a manual switch (not shown in FIG. 1).

After the meter 16 has been calibrated, the recorder is caused to play back to the circuit 13 the recorded audio signal representing the speed of the vehicle. The meter 16 will now register the true speed of the vehicle. It is to be noted that the above procedure for calibrating the meter and determining the true speed of the vehicle will involve playing back the recorded information twice, since the signal representing the speed of the vehicle is recorded before the calibration signal.

As an alternative method of calibrating the meter, the speed of the recorder can be adjusted to a slower speed or a faster speed until the meter indicator indicates the speed represented by the calibration signal. Changing the recorder speed will, of course, change the frequency of the calibration signal and consequently will change the amplitude of the signal supplied to the meter.

The identification of the vehicle, which previously had been recorded by an officer, can be reproduced into speech by means of a speaker, which is a part of the recording unit.

Assume now that instead of employing the reproducing equipment 25 to obtain permanent records of the speed of the vehicle, it is desired to use the camera equipment 23 for this purpose. To accomplish this result the switch 26 is opened and the switch 24 is closed. If, now, a speeding vehicle comes within range of the radar unit, the speed responsive relay means 31 will become energized to supply a voltage to the camera equipment 23, which will light the lamps and operate the camera solenoid. Operation of the camera solenoid will operate the camera, which preferably is a movie camera. The camera equipment is constructed and arranged to film, simultaneously, the vehicle and the meter reading, thus establishing both the speed and the identity of the vehicle. When the car passes out of range of the apparatus, the relay means 31 will become de-energized, causing de-energization of the camera equipment 23. However, as stated hereinbefore, the circuit means 22 will respond to the de-energization of the relay means 31 to cause an energizing signal to be supplied to the calibration signal source 27. The signal generated by the calibration signal source 27 will be supplied to the circuit means 13 and, in a manner described hereinbefore, will cause the meter 16 to indicate a particular speed which, if the meter is correctly adjusted, will be the speed represented by the calibration signal. This calibration signal will cause the relay means 31 to be energized again to cause an energizing voltage to be supplied to the camera equipment 23 through the conductor 32. The camera will film the calibrated meter reading to provide proof, at a later date, that the meter was calibrated correctly at the time the indicated speed of the speeding vehicle was photographed. When the calibrated signal source becomes de-energized at the end of a short period of time (determined by the aforementioned time delay circuit means contained within the block 22) the speed responsive relay means 31 will become de-energized to de-energize the camera equipment 23.

It is to be noted that circuitry (not shown) is provided within the block 23, which will function to cause the lamps to be illuminated in response to a speeding vehicle only during the nighttime. This result can be effected by a switch (not shown) which can be operated manually.

If desired, a traffic control light 28 can be employed with the radar equipment. This traffic light is controlled by energization of the relay 31. Means are provided to maintain energization of the traffic light until an operator chooses to de-energize it.

An additional feature of the invention is the meter 147, which is situated at some point remote from the radar equipment, as, for example, near the traffic light. The meter 147 is constructed to be responsive to the output of the meter hold circuit 15 to register the same reading as the meter 16.

Figure 2:
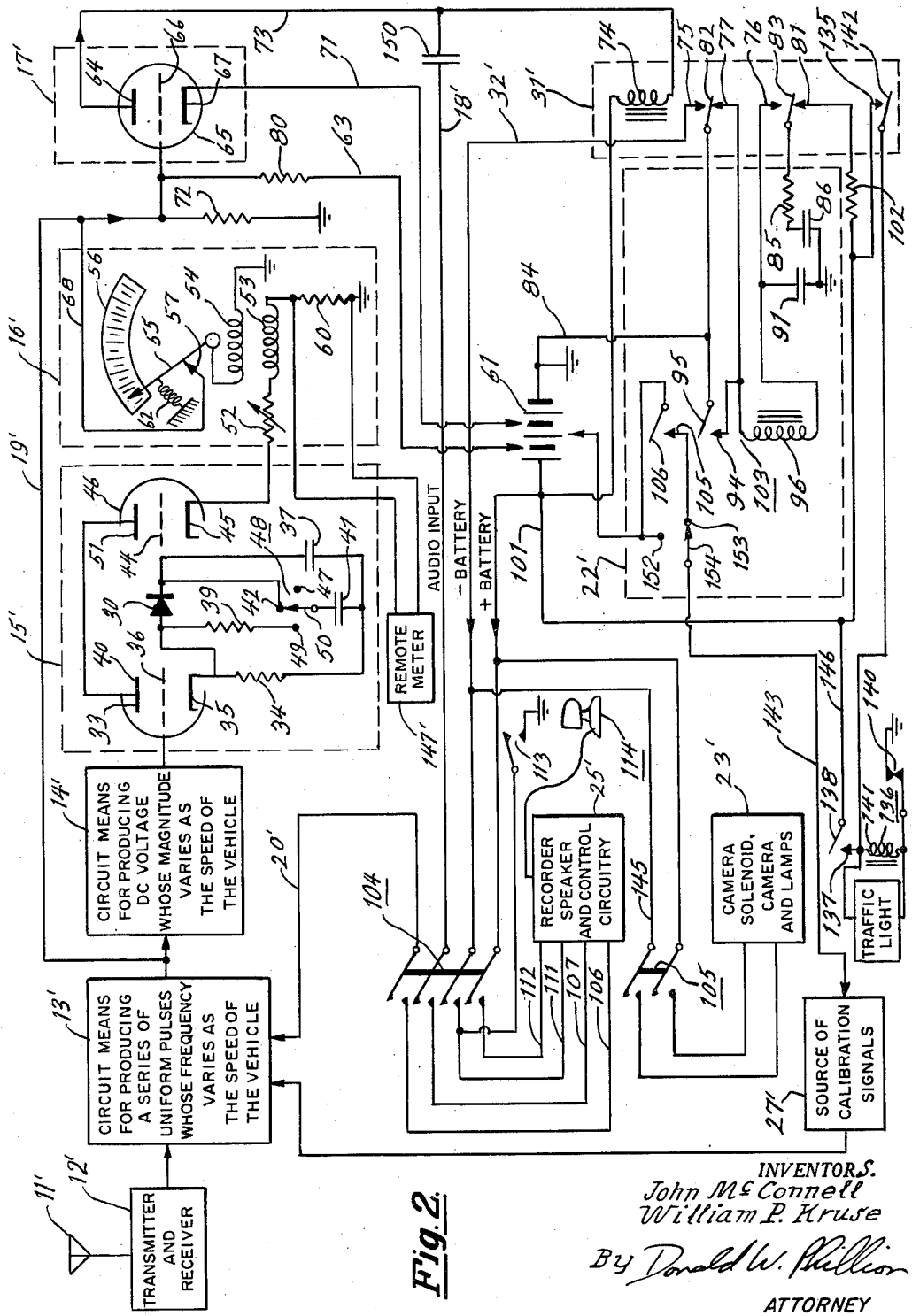
FIG. 2 is a combination block diagram and schematic sketch of the invention.

Referring now to FIG. 2, there is shown a combination schematic diagram and block diagram of the circuit of FIG. 1. The blocks of FIG. 2 correspond to blocks of FIG. 1 and are given the same reference characters (primed). More specifically, the blocks 12', 13', 14', 15', 16', 17', 31', 22', 23', 25', and 27' correspond to the blocks 12, 13, 14, 15, 16, 17, 31, 22, 23, 25, and 27 of the diagram of FIG. 1.

The overall operation of the circuit has been discussed with reference to the circuit of FIG. 1 and will not be repeated with respect to FIG. 2. The circuits within some of the blocks can be conventional-type circuits and need not be described in detail. This is particularly true of the circuits represented by the blocks 12', 13', and 14'. However, the circuits represented by the other blocks are not conventional-type circuits and will be described in detail with the aid of FIG. 2. More specifically, the meter hold circuit 15', the meter 16', the relay driver 17', the speed responsive relay means 31', and the means for providing automatic or manual energization of the source of calibration signals 22' will be discussed in detail.

The meter hold circuit 15' comprises a cathode follower circuit including the triode 33 having a plate 40, a control grid 36 and a cathode 35 to which is connected the cathode resistor 34. The cathode follower circuit is employed to provide a low impedance source for charging the capacitor 41 through the diode 39. As will be seen in more detail later, the capacitor 41 constitutes part of the time delay circuit which functions to hold the reading of the meter 16' for several minutes.

In operation, a positive D.-C. input signal is supplied to the control grid 36 of tube 33 from circuit means 14' to produce a positive output signal at the cathode 35 of the tube 33. This positive output signal is supplied to the capacitor 37 and to the capacitor 41 through the asymmetrical device 30, (assuming the manually operated switch 48 is positioned so that the capacitor 41 is connected to the contact button 42 through the arm 50). The discharge circuit for the capacitors 41 and 37 is across the control grid 44-cathode 45 gap of the triode 46, which gap constitutes a high impedance. It is to be noted that the capacitor 37 is quite small so the time delay produced by the charge thereon is of the order of a second or two. However, the capacitor 41 is large so that a time delay of the order of several minutes is obtained thereby. When the switch 48 is operated so that the capacitor 41 is connected to the contact button 47, the capacitor 41 is disconnected from the circuit and performs no function. The amount of time delay is then determined solely by the capacitor 37. To discharge the large capacitor 41, the arm 50 of the switch 48 is caused to make with the contact 49, thus providing a discharge path for the capacitor 41 through resistor 39 and resistor 34.

It can be seen from FIG. 2 that the voltages existing across the capacitors 37 and 41 are impressed on the control grid 44 of the triode 46, which also comprises the anode 51 and the cathode 45. The tube 46 is part of a cathode follower circuit which also includes the variable resistor 52, the winding 53, and the resistor 60. When the potential of the control grid 44 increases, the potential of the cathode 45 will similarly increase, thus increasing the current through the winding 53. The winding 53 constitutes the moving coil of the meter 16 and the current flowing therethrough will produce a force tending to cause the indicator 55 of meter 16' to move to the right in FIG. 2. When no current is flowing through the winding 53 the spring 62 will cause the needle 55 to move to the left until it comes to rest upon the contact 57. The contact 57 can be moved physically to the right or to the left in FIG. 2 so that the indicator 55 will come to rest thereon at different points, thus enabling an operator to establish a desired minimum reading of the meter 16'. This minimum reading, as well as other readings of the meter 16', can be read by means of the scale 56. The tension produced by the spring 62 exerts a constant force upon the needle 55, which increases as the needle 55 moves to the right. Thus, the amount of force required to be produced by the winding 53 to move the indicator away from the contact 57 is determined by the positioning of the contact 57. As will be seen later, this adjustable minimum reading feature of the meter 16' provides a means whereby the remainder of the apparatus including the camera or the sound recording equipment will not operate except when a vehicle exceeding the selected minimum speed limit comes into the range of the radar equipment.

The winding 54 is wound so that when the contact 57 is closed, the current flow from battery 61, through conductor 63, resistor 80, conductor 68, contact 57, and the winding 54, will produce a force tending to deflect the needle 55 to the left in FIG. 2. However, this force is relatively small and is useful only when the rate of speed of the speeding vehicle is near the minimum speed setting of the meter 16'. More specifically, if the minimum reading of the meter is selected to be at 40 miles per hour, for example, and if a vehicle is travelling near that speed, the small force produced by the winding 54 will prevent the needle 55 from leaving the contact 57 until the speed of the vehicle increases to about 43 miles per hour. Thus, any unstable closing and opening of the contacts 57 is prevented.

Referring now to the relay driver circuit 17', it will be noted that the triode 64, which consists of anode 65, control grid 66, and cathode 67, is, when the meter 16' is not energized, in a non-conductive state. This non-conductive state is due to the fact that the control grid 66 is substantially at ground potential in a circuit which may be traced through the winding 54 of the meter 16' to ground potential, and to the fact that the cathode 67 is connected to a positive battery source 61 (which is well above plate current cut-off potential) through conductor 71. However, when a speeding vehicle does cause the contact 57 to become opened, ground potential will be removed from the control grid 66 of tube 64 and the positive potential of battery source 61 will divide across resistors 80 and 72. Since the value of resistor 72 is large compared to the value of resistor 80, most of the positive potential derived from battery source 61 will appear across resistor 72 and be supplied to the control grid 66. The circuit is designed so that under these conditions the potential of the grid 66 attempts to rise above the potential of the cathode 67. As a result, the tube 64 will suddenly draw plate current through a circuit path which may be traced from the plate 64, through conductor 73, winding 74 of relay 31', to the positive terminal of the battery 61.

The relay 31, which comprises normally opened contacts 75 and 76, normally closed contacts 77 and 81, and armatures 82 and 83, operates in response to the current through winding 74 to open the normally closed contacts 77 and 81 and to close the normally opened contacts 75 and 76. Closure of contact 75 will supply negative battery to the camera equipment or to the audio reproducing equipment (whichever is being used) in a circuit which may be traced from the negative terminal of the battery 61, through the conductor 84, the armature 82, the contact 75, and the conductor 32'. This negative battery will function to energize either the camera equipment or the audio recording equipment.

Closure of the contact 76 will initiate the operation of the automatic circuitry for checking the calibration of the meter 16' and for providing a permanent record of such a check. The above functions occur in the following manner:

Immediately before the contact 76 is closed, the capacitor 91 has no charge thereon, since both terminals are at ground potential; one terminal of the capacitor 91 being connected to ground potential through the winding 96 of relay 103, contact 77 of relay 31' and the conductor 84, and the other terminal being connected directly to ground potential. Further, before the contact 76 is closed, the capacitor 86 is charged positively through a circuit which may be traced from positive battery 61, through conductor 101, resistor 102, contact 81, and resistor 85. When the contact 76 closes, the capacitor 86 will discharge into the capacitor 91 in a circuit which may be traced through resistor 85 and contact 76. When the speeding vehicle passes out of range of the equipment, the relay 31 will become de-energized and the contacts 75 and 76 will open. Opening of contact 75 will de-energize the camera equipment or the sound recording equipment, whichever is being used. Opening of the contact 76 will disconnect the capacitor 91 from the capacitor 86 and will create a discharge path for the capacitor 91, which may be traced from capacitor 91 through winding 96 of relay 103, contact 77 of relay 31′, and conductor 84 to ground potential. Discharge of capacitor 91 through the winding 96 will energize relay 103 to close contact armature 106 upon contact 105, and armature 95 upon locking contact 94. Closure of contact 105 will supply energizing potential from the battery source 61 to the calibration source 27′ through conductor 143. The calibration source will respond thereto to generate an audio signal representative of a particular speed. A detailed description of the calibration source will be set forth later herein. This audio signal will, as described hereinbefore, produce a response in the circuit of FIG. 2, which will result in a second energization of the relay 31′. Energization of relay 31′ will cause arms 82 and 83 to close upon contacts 75 and 76. Closure of contacts 75 will energize the camera equipment or the audio recording equipment, whichever is being used. Closure of contact 76 will provide a discharge path for the capacitor 86, which has become fully positively charged again during the short time interval that relay 31′ was de-energized. This discharge path can be traced from the capacitor 86, through resistor 85, contact 76, winding 96 of relay 103, contact 94, and through conductor 84 to ground potential. Thus, energization of relay 103 is maintained during the discharging of the capacitor 86. The circuit is designed so that this discharge time is of a sufficiently long duration to maintain energization of relay 103 for about one-fourth second. During this quarter-second time interval, the camera equipment or audio recording equipment will be energized (as indicated above) and will make a permanent record of the calibration check. When the discharge current of the capacitor 86 becomes insufficient to maintain energization of the relay 103, the relay 103 will become de-energized, causing its contacts 105 and 94 to open. Opening of the contact 105 will cause de-energization of the calibration source 27′ and subsequently, de-energization of the relay 31′. De-energization of the relay 31′ will cause de-energization of the camera equipment or the audio recording equipment, whichever is being employed.

It will be noted that when the relay 31′ is energized initially the armature 142 will be closed upon the contact 135. Closure of contact 135 will result in operation of a traffic light 139. This will be described in more detail later.

The gang switch 104 is closed when it is desired to use the audio recording equipment 25′. Conductors 111 and 112 will then carry the energizing battery supply to the audio equipment 25. The speed indicating audio signal to be recorded is supplied to the sound recording equipment through A.-C. coupling capacitor 150 and the conductors 18′ and 107. After being recorded, the speed indicating audio signals can be played back to the circuit means 13′ through the conductor 106, switch 104, and the conductor 20′.

Switch 113 is manually operated by an operator to provide negative battery (ground potential) to the recording equipment when the operator wishes to use the microphone 114 to record information. It is necessary to provide negative battery in this manner, since the relay 31′, which, when energized ordinarily functions to supply this negative battery in response to the presence of a speeding vehicle, would not be energized, necessarily, when the microphone was being used.

If it is desired to use the camera equipment 23′ the gang switch 105 is closed and the gang switch 104 is opened. When negative battery (ground potential) is supplied to the camera equipment 23′ through conductor 145, the lamps are lit and the camera solenoid is operated which, in turn, operates the camera.

Figure 3:
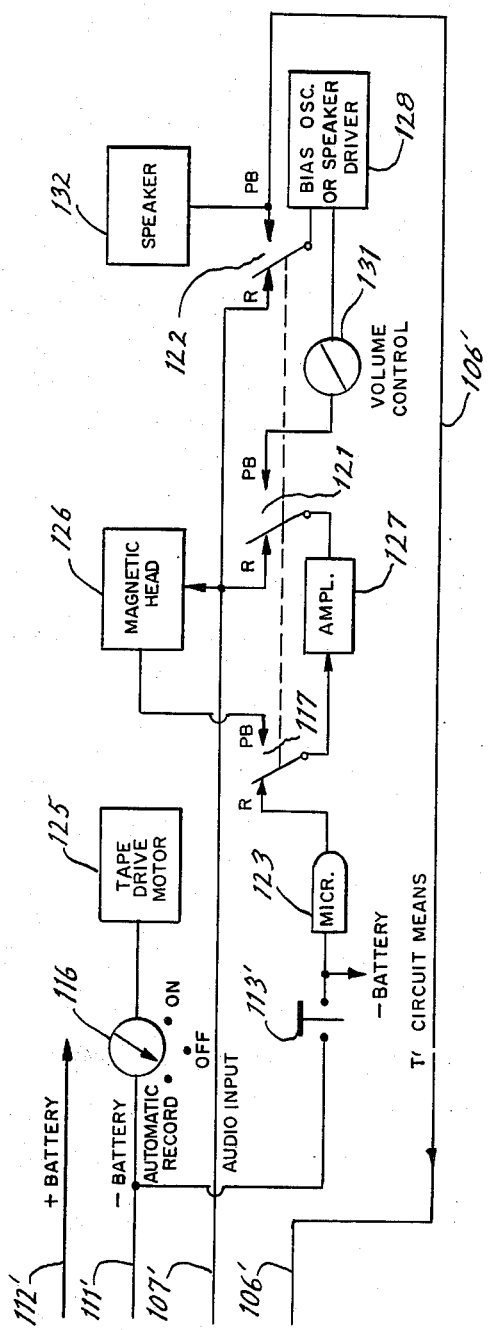
FIG. 3 is a block diagram of the audio recording system and the control circuit therefore.

Referring now to FIG. 3, there is shown a block diagram of a suitable arrangement of the audio recorder and the control circuit therefor. The conductors 112′, 111′, 107′, and 106′, correspond to conductors of FIG. 2, which are identified by similar reference characters (unprimed).

The negative battery supply is supplied to the tape drive motor 125 through the control means 116, which has three positions: "off," "automatic record," and "playback." The three sets of contacts, 117, 121, and 122, are operated by the control means 116 to either "playback" position (marked PB) or to "record" position (marked R).

When in the "record" position, as is shown in FIG. 3, audio signals to be recorded can be supplied from two sources. One of these sources is the microphone 123, into which a patrolman can describe a speeding vehicle. The other source of audio signals is through the conductor 107′, over which the speed representing signals or the calibration signals are conducted. When using the microphone 123, it is necessary to provide manual means for energizing the recorder, since the recorder ordinarily would operate only when a speeding vehicle was within range of the equipment. This manual means is provided by switch 113′, which corresponds to switch 113 of FIG. 2 and which, when depressed, will connect negative battery (ground potential) to the tape drive motor. The audio output from the microphone is supplied to the magnetic head 126 in a circuit which may be traced from the microphone 123 through switch 117 (when in "record" position), the amplifier 127, and the switch 121.

The circuitry within the block 128 performs two functions. When the recorder is in its "record" position the circuit within the block 128 functions in a well known manner as a bias oscillator for supplying a high frequency signal to the magnetic recording head 126 of the recorder. Reference is made to United States Patent No. 2,351,004, issued June 13, 1944, to M. Camras, for a more detailed discussion of the use of the bias oscillator.

When the recorder is in its "playback" position, the circuitry within the block 128 is employed as an amplifier for driving the speaker 132. Under these conditions, the circuit path for the recorded signal may be traced from the magnetic head 126 through the switch 117 (which is in "playback" position), amplifier 127, switch 121, volume control means 131, speaker driver 128, switch 122, to the speaker 132. It is to be noted that the signal supplied to the speaker 132 is also supplied to the circuit means 13′ (FIG. 2) through the conductor 106′. Thus, since the signal supplied to the speaker 132 includes, in addition to the spoken description of the speeding vehicle, the recorded speed indicating signal and the recorded calibration signal, the meter 16′ will indicate both the speed of vehicle and also the speed corresponding to the calibrated signal. It will be observed that in "playback" position the microphone 123 is disconnected from the circuit by means of switch 117.

When the switch 116 is in the "off" position, the negative battery source suplied via conductor 111 will be disconnected from the tape drive motor 125.

Sometimes it becomes desirable to adjust the meter 16′ (of FIG. 2) or the remote meter 147′ (also of FIG. 2). Such adjustment can be effected by manually energizing the calibration signal source 27′. More specifically, the operator can energize the calibration signal source 27′ by moving the movable contact 154 from contact 153 to contact 152 which is connected directly to positive battery source 61. When the movable contact 154 is closed upon contact 153 the calibration signal source will become energized immediately after each occasion of a speeding vehicle exciting the system, as described hereinbefore.

Referring again to FIG. 2, the operation of the traffic light will be considered in more detail. When relay 31′ is energized, owing to the presence of a speeding vehicle within the range of the radar equipment, the armature 142 will close upon the contact 135, thus supplying positive battery to the winding 141 of relay 136 and to the traffic light 139 in a circuit which may be traced from battery source 61, conductor 101, contact 135, and armature 142. Relay 136 will be operated by this positive battery to close the armature 138 upon the contact 137 to complete a holding circuit for the relay 136 through conductor 146. Energizing potential will also be supplied to the traffic light 139 through the conductor 146 and the contact 137. The traffic light will stay energized until the relay 136 is de-energized. Such de-energization may be accomplished by a release switch 140 which may be located near the traffic light and which may be operated manually.

The remotely located meter 147' may be connected across the resistor 69. Since the current flowing through resistor 69 is essentially the same current flowing through the moving coil 53, the meter 147' can be calibrated to register the same readings as meter 16'.

Figure 4:
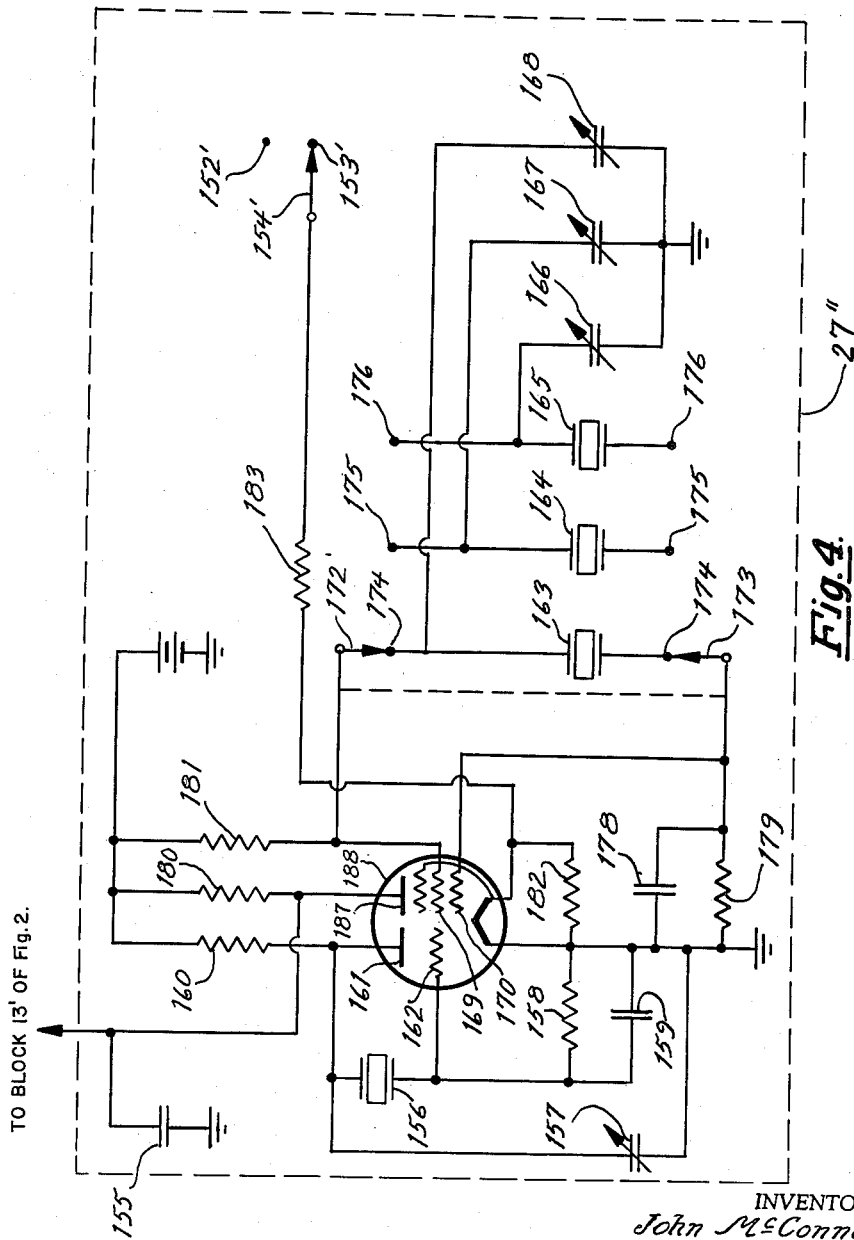
FIG. 4 is a schematic sketch of a suitable calibration means.

Referring now to FIG. 4, there is shown a schematic sketch of a circuit suitable as a calibration signal source. The envelope 188 contains a triode and a pentode, each of which comprises a portion of a separate oscillator. The high frequency output signals of the two oscillators are mixed within the envelope 188 to produce a resultant signal at the plate 187 of the pentode, which resultant signal contains a component having a frequency within the audio range and equal to the difference between the two oscillatory signals, as well as high frequency components. The audio frequency is representative of a particular velocity. Capacitor 155 functions to by-pass the high frequency components of said resultant signal to ground potential leaving just the audio component to be supplied to the block 13' of FIG. 2.

Reference will be made now to the specific circuits for the aforementioned oscillators. The oscillator comprising the triode also comprises a crystal 156 connected between the plate 161 and the grid 162 of the triode, fine tuning variable capacitor 157, grid leak resistor 158, plate load resistor 160, and by-pass capacitor 159, which functions to by-pass the harmonics of the fundamental oscillating frequency.

The oscillator comprising the pentode also comprises a plurality of crystals 163, 164, and 165, respectively. Capacitor 178 functions as a by-pass capacitor for harmonics of the fundamental oscillating frequency. Resistor 179 functions as a grid leak resistor, resistor 180 is the plate load resistor, resistor 181 is a screen grid potential dropping resistor, and resistor 182 is part of a voltage divider which also includes resistor 183.

The purpose of employing the three crystals 163, 164, and 165 is as follows: When calibrating the meter it is sometimes desirable to calibrate it at different speeds. For example, if the apparatus were employed in a 30 mile per hour speed zone, it would be desirable to calibrate the meter at a speed somewhere near 30 miles per hour. Similarly, if the speed zone were 60 miles per hour, it would be desirable to calibrate the meter somewhere near 60 miles per hour.

The movable contacts 172 and 173 are constructed and arranged to make contact selectively and simultaneously with the contacts of each pair of contacts 174, 175, and 176. Since each of the three crystals resonates at a slightly different frequency, three different resultant audio signals can be produced, each representative of a different speed and facilitating calibration of the meter for different speed zones. The variable capacitors 166, 167, and 168 are provided for fine tuning of crystals 163, 164, and 165, respectively.

It is to be understood that the forms of the invention herein shown and described are but preferred embodiments of the same and that various changes may be made in the various circuit arrangements without departing from the spirit or scope of the invention.

We claim:

1. Apparatus for detecting and recording the speed of a moving object comprising means for radiating an alternating signal, means for receiving such signal as reflected from such moving object, means for producing an output signal having a characteristic of value proportional to the difference in frequencies of said radiated and reflected signals, visual indicator means responsive to said output signal for indicating the speed of such moving object, cooperating electrical contacts actuatable by operation of said visual indicator means in response to said output signal reaching a value corresponding to a predetermined speed of such moving object, and recording means operable by such actuation of said electrical contacts for making a permanent record of the speed and identification of such moving object.

2. Apparatus for detecting and recording the speed of a moving object comprising means for radiating an alternating signal, means for receiving such signal as reflected from such moving object, means for producing an output signal having a characteristic of value proportional to the difference in frequencies of such radiated and reflected signals, visual indicator means responsive to said output signal for indicating the speed of such moving object, cooperating electrical contacts actuatable by operation of said visual indicator means in response to said output signal reaching a value corresponding to a predetermined speed of such moving object, magnetic recording means operable by such actuation of said electrical contacts, means for applying said output signal to said recording means, and a microphone connected to said recording means for permitting the recording of identification of such moving object.

3. Apparatus for detecting and recording the speed of a moving object comprising means for radiating an alternating signal, means for receiving such signal as reflected from such moving object, means for producing an output signal having a characteristic of value proportional to the difference in frequencies of said radiated and reflected signals, visual indicator means responsive to said output signal for indicating the speed of such moving object, cooperating electrical contacts actuatable by operation of said visual indicator means in response to said output signal reaching a value corresponding to a predetermined speed of such moving object, photographic recording means operable by such actuation of said electrical contacts for photographing said visual indicator means and such moving object.

4. Apparatus for detecting and recording the speed of a moving object comprising means for radiating an alternating signal, means for receiving such signal as reflected from such moving object, means for producing an output signal having a characteristic of value proportional to the difference in frequencies of said radiated and reflected signals, visual indicator means responsive to said output signal for indicating the speed of such moving object, cooperating electrical contacts actuatable by operation of said visual indicator means in response to said output signal reaching a value corresponding to a predetermined speed of such moving object, recording means operable by such actuation of said electrical contacts for making a permanent record of the speed and identification of such moving object, and calibrating means operable by such actuation and subsequent deactuation of said electrical contacts for producing and applying to said visual indicator means a calibrating signal, said electrical contacts being reactuatable by application of said calibrating signal to said visual indicator means whereby said recording means may record said calibrating signal.

5. Apparatus for detecting and recording the speed of a moving object comprising means for radiating an alternating signal, means for receiving such signal as reflected from such moving object, means for producing an output signal having a characteristic of value proportional to the difference in frequencies of said radiated and reflected signals, visual indicator means responsive to said output signal for indicating the speed of such moving object, control apparatus actuatable upon said output signal reaching a value corresponding to a predetermined speed of such moving object, recording means operable by such actuation of said control apparatus for making a permanent record of the speed and identification of such moving object, and calibrating means operable by such actuation and subsequent deactuation of said control apparatus for producing and applying to said visual indicator means a calibrating signal, said control apparatus being reactuatable by said calibrating signal whereby said recording means may record said calibrating signal.

6. Apparatus for detecting and recording the speed of a moving object comprising means for radiating an alternating signal, means for receiving such signal as reflected from such moving object, means for producing an output signal having a characteristic of value proportional to the difference in frequencies of said radiated and reflected signals, visual indicator means responsive to said output signal for indicating the speed of such moving object, control apparatus actuatable upon said output signal reaching a value corresponding to a predetermined speed of such moving object, magnetic recording means operable by such actuation of said control apparatus, means for applying said output signal to said recording means, and a microphone connected to said recording means for permitting the recording of identification of such moving object.

7. Apparatus for detecting and recording the speed of a moving object comprising means for radiating an alternating signal, means for receiving such signal as reflected from such moving object, means for producing an output signal having a characteristic of value proportional to the difference in frequencies of said radiated and reflected signals, visual indicator means responsive to said output signal for indicating the speed of such moving object, control apparatus actuatable upon said output signal reaching a value corresponding to a predetermined speed of such moving object, and photographic recording means operable by such actuation of said control apparatus for photographing said visual indicator means and such moving object.

8. Apparatus for detecting and recording the speed of a moving object comprising means for radiating an alternating signal, means for receiving such signal as reflected from such moving object, means for producing an output signal having a characteristic of value proportional to the difference in frequencies of said radiated and reflected signals, visual indicator means responsive to said output signal for indicating the speed of such moving object, control apparatus actuatable upon said output signal reaching a value corresponding to a predetermined speed of such moving object, photographic recording means operable by such actuation of said control apparatus for photographing said visual indicator means and such moving object, and calibrating means operable by such actuation and subsequent deactuation of said control apparatus for producing and applying to said visual indicator means a calibrating signal, said control apparatus being reactuatable by said calibrating signal whereby said recording means may record said calibrating signal, as evidenced by said visual indicator means.

9. Apparatus for detecting and recording the speed of a moving object comprising means for radiating an alternating signal, means for receiving such signal as reflected from such moving object, means for producing an output signal having a characteristic of value proportional to the difference in frequencies of said radiated and reflected signals, visual indicator means responsive to said output signal for indicating the speed of such moving object, control apparatus actuatable upon said output signal reaching a value corresponding to a predetermined speed of such moving object, recording means operable by such actuation of said control apparatus for making a permanent record of the speed and identification of such moving object, and calibrating means operable by such actuation and subsequent deactuation of said control apparatus for producing a calibrating signal, said control apparatus being reactuatable by said calibrating signal whereby said recording means may record said calibrating signal.

10. Apparatus for detecting and recording the speed of a moving object comprising means for radiating an alternating signal, means for receiving such signal as reflected from such moving object, means for producing an alternating output signal having a frequency of value proportional to the difference in frequencies of said radiated and reflected signals, circuit means responsive to said output signal for producing a D.C. signal of voltage proportional to the frequency of said output signal, visual indicator means responsive to said D.C. signal for indicating the speed of such moving object, control apparatus actuatable by operation of said visual indicator means in response to said output signal reaching a frequency corresponding to a predetermined speed of such moving object, and magnetic recording means operable by such actuation of said control apparatus for making a permanent record of said output signal.

11. Apparatus for detecting and recording the speed of a moving object comprising means for radiating an alternating signal, means for receiving such signal as reflected from such moving object, means for producing an alternating output signal having a frequency of value proportional to the difference in frequencies of said radiated and reflected signals, circuit means responsive to said output signal for producing a D.C. signal of voltage proportional to the frequency of said output signal, an electrical meter, and meter holding circuit means responsive to application of said D.C. signal thereto for actuating said meter to indicate the speed of such moving object and for maintaining said meter at its highest reading after cessation of said D.C. signal, said meter holding circuit means including a signal translating device having a control electrode, a rectifier arranged to conduct D.C. signals to said control electrode, and a capacitor connected to said control electrode to maintain said electrode substantially at the maximum voltage applied thereto.

References Cited in the file of this patent

UNITED STATES PATENTS

| | | |
|---|---|---|
| 2,347,194 | Holliday | Apr. 25, 1944 |
| 2,629,865 | Barker | Feb. 24, 1953 |
| 2,683,071 | Pearle | July 6, 1954 |
| 2,785,395 | Platzman | Mar. 12, 1957 |
| 2,878,467 | Barker | Mar. 17, 1959 |
| 2,965,893 | Barker | Dec. 20, 1960 |

OTHER REFERENCES

Automatic Signal Division, Eastern Industries Inc., Norwalk, Conn., Bulletin R-102.